(12) United States Patent
Schneider et al.

(10) Patent No.: US 7,371,398 B2
(45) Date of Patent: May 13, 2008

(54) BOVINE TEAT CLEANING PROCESS USING DRY POWDER REAGENTS

(75) Inventors: David J. Schneider, Union, KY (US); Charles A. Schneider, Villa Hills, KY (US)

(73) Assignee: H&S Chemical Company, Inc., Covington, KY (US)

(*) Notice: Subject to any disclaimer, the term of this patent is extended or adjusted under 35 U.S.C. 154(b) by 0 days.

(21) Appl. No.: 10/949,516

(22) Filed: Sep. 24, 2004

(65) Prior Publication Data

US 2005/0072373 A1    Apr. 7, 2005

Related U.S. Application Data

(60) Provisional application No. 60/506,709, filed on Sep. 26, 2003.

(51) Int. Cl.
*G01N 25/32* (2006.01)

(52) U.S. Cl. ............... 424/406; 424/405; 424/661; 424/670; 424/671; 514/245

(58) Field of Classification Search ............ None
See application file for complete search history.

(56) References Cited

U.S. PATENT DOCUMENTS 3,728,449 A * 4/1973 Cantor et al. .......... 424/671
6,534,075 B1 * 3/2003 Hei et al. .............. 424/405

* cited by examiner

*Primary Examiner*—Neil S. Levy
(74) *Attorney, Agent, or Firm*—Richard M. Klein; Fay Sharpe LLP

(57) ABSTRACT

Animals have been domesticated and kept as a source of milk for tens of thousands of years. When humans keep animals for their ability to produce milk, the animals are usually kept in confined spaces. As a result of this confinement the animals are exposed to high levels of urine and fecal matter which originated with the animals which are being kept. This exposure contaminates the animal and in particular the udder and teats of the animal, with bacteria. In the milking process this bacteria can further contaminate the milk which is destine for human consumption. The bacteria can further cause mastitis in the bovine. The above set forth problems are eliminated in the subject invention wherein the udder and teat areas of the bovine are sanitized with a solution which contains both Cl+ and I+ ions wherein the I+ ion is produced by the oxidation of a solution of a dry iodine salt, without an N-chloro organic compound. The iodine salt may be an alkali metal iodide, an exemplary oxidizer is tricholormelamine.

6 Claims, No Drawings

BOVINE TEAT CLEANING PROCESS USING DRY POWDER REAGENTS

RELATED APPLICATIONS

This application claims priority of Provisional Application Ser. No. 60/506,709 filed Sep. 26, 2003

BACKGROUND OF THE INVENTION

Bovines and in particular cows have been milked for thousands of years. Because the udder and teats of a cow are located on its underside they are easily contaminated with bacteria. In the milking process this bacteria can easily contaminate the resulting milk. In addition this bacteria can spread to the mammary tract of the cows utter causing infections which are referred to as mastitis. These infections can severely restrict the amount of milk produced by the cow, and hence the economics of the dairy in question.

In the past efforts have been made to sanitize the teats and udder areas of a bovine prior to the milking process. Past attempts to sanitize the udder and teats consisted of washing with soap, and water and washing with solutions of iodine based compounds.

These prior art attempts to sanitize the udder and teats of a bovine have proved to be ineffective and/or troublesome.

This application relates to sanitizing the udder and teats of an animal prior to the milking process. While this application primarily refers to sanitizing the udder and teats of a bovine, it is understood by one skilled in the art, that the process of this invention is applicable to any milk giving animal.

PRIOR ART

In the past the milking of bovines has often been effected on unsanitary udders and teats. Often in the past the udders and teats were only washed, if washed at all, with unsanitized water.

Early in the twentieth century, to a limited degree, the udders and teats of bovines were washed with crude soap prior to the milking process. While washing with soap helped, to a limited degree, the udder and teats of the bovine were not sanitized by this procedure.

In the past decades, it has become common to sanitize the udders and teats of a bovine prior to and after the milking process. The most common sanitizing agents used are aqueous solutions of iodine or iodine compounds. While these iodine based solutions are effective in killing bacteria they have drawn backs such as;

1. Iodine based compounds are hard on the tissue of the udder and teats.
2. Iodine based sanitizing solutions tend to stain the udder and teats and the hands and clothing of the operator.
3. Iodine based sanitizing solutions must be shipped in liquid form. This shipping of water substantially increases the shipping cost.
4. Iodine based sanitizing solutions are expensive.

This invention is concerned with a new process for sanitizing the teats of a bovine wherein the teat cleaning solutions are mixed at the venue, where the cleaning is effected, by dissolving dry active ingredients in water, to form a teat cleaning solution.

This invention is concerned with the use of dry iodine salts to form teat cleaning solutions on an as needed basis.

BRIEF DESCRIPTION OF THE INVENTION

The udder and teat area of bovines are often contaminated with bacteria. During the milking process this bacterial can be transferred to the milk with severe consequences. Further the bacteria can cause the infection of the teats, these infections are referred to as mastitis. These infections can detrimentally affect milk production and the overall health of the animal.

In accordance with this invention the udder and teat areas of an animal may be sanitized and infections of the teats eliminated by washing the udder and teat areas with a solution which contains both Cl+ and I+ ions.

In accordance with this invention the udder and teat washing is effected with a solution which contains an effective amount of active Cl+ and I+ ions.

The solutions of Cl+ and I+ ions for use in this invention may further incorporate additives which aid in the sanitizing process or aid in enhancing the health and well being of the animal which is being milked.

DESCRIPTION OF THE PREFERRED EMBODIMENT

Animals have been domesticated by man and kept for their milk production for thousands of years. In order that the animals might be controlled and restrained they are most often kept in a confined space i.e. a herd of dairy cows which are kept in a dairy barn. In fact the process of this invention is most often utilized with dairy cows which are kept in a dairy barn.

Because domesticated animals are kept in a confined space, as is discussed above, they are often kept in unsanitary conditions. These un-sanitized conditions result from the fact that the under side areas of the animals come into contact with urine a fecal matter. This urine and fecal matter naturally is contaminated with a wide range of bacteria such as *E Coli*. This bacteria can contaminate the milk, if the udder and teat areas of the cow are not sanitized prior to the milking process.

In this application references will often be made to sanitizing the udder and teat areas of cows. It is understood by one skilled in the art that the process of this invention is also applicable to other animals such as goats. In fact the process of this invention is applicable to any animal which gives milk.

As a broad overview this invention is concerned with a process for sanitizing the udder and teat areas of an animal using solutions which incorporate both active Cl+ and active I+ ions. A very common sanitizing agent is bleach which kills a wide spectrum of bacteria. Solutions of sodium hypochlorite are often referred to as bleach. While bleach is a very effective biocide its action is very harsh on living tissue. As such, solutions of bleach are not suitable as a biocide for dairy animals. That is if a solution of bleach were applied to the udder and teat areas of a cow the bacteria would be killed however, the tender tissue of these areas would be adversely affected. In fact if bleach were applied to the udder and teat areas of a cow, one would have a very unhappy cow.

The active agent in bleach is the Cl+ ion which is capable of killing a wide spectrum of bacteria.

This invention relates to the use of solutions which incorporate both active Cl+ and active I+ ions, as an active agents for sanitizing the udder and teat areas of cows. The solutions of this invention are capable of killing a wide spectrum of bacteria.

The process of this invention is effected by spraying the udder and teat areas of a bovine with an iodine based solution wherein the solution is formed on an as needed basis from dry reagents.

The process may be further effected by dipping the udder and teat areas in the solution of this invention.

Iodine based teat cleaning solutions are known in the prior art and in fact represent the state of the art.

In the prior art the dairyman must order an iodine based teat cleaning solution in liquid form. Because the prior art teat cleaning formulations are in liquid form, substantial shipping expenses are incurred as the dairyman is essentially paying for the shipment of water. That is the active ingredients in the prior art iodine based teat cleaning formulations represent only a small percentage of the weight of the prior art cleaning solution, as shipped. Further because the iodine based solutions are strong oxidizers, the shipping of these oxidizers is carefully regulated.

Also in accordance with the prior art process the dairyman must store and handle heavy drums of iodine based teat cleaning solutions. Likewise, because the drums contained an oxidizer the disposal of these drums in accordance with environmental regulations presents a problem.

In its simplest form this invention entails the formulation of a teat cleaning solution on an as need basis from a dry iodine salt. These teat cleaning solutions are formed at the site of the usage. These solutions are formed from a dry iodine salt which is oxidized to elemental iodine. The oxidization is effected in an aqueous solution, upon formation the elemental iodine goes into solution, to form the active I+ ion which functions as a teat cleaning solution.

The mixing of the dry iodine salt with an oxidizing agent, in order to effect the formation of an active iodine based teat cleaning formulation, may be carried out in an induction mixer.

Preferred iodine salts for use in this invention are alkali metal salts such as, sodium iodine and potassium iodide. It is understood by one skilled in the art that any suitable iodide salt may be used.

For purposes of oxidizing the I-ion to the I+ ion it is preferred that oxidizing agents which will act on the acidic side, be utilized. Further it is preferred that chlorine based oxidizing agents be used. An example of a suitable chlorine based oxidizing agent is trichloromelamine herein after TCM. It is preferred that an excess of the chlorine based oxidizing agent be utilized.

For the sake of safety the I+ source i.e. sodium iodide must not be allowed to remain in contact with the oxidizer i.e. trichloromelamine for any extended period of time in order to prevent a spontaneous reaction. As a means of preventing the undesired reaction of the alkali metal iodide with the oxidizer i.e. TCM, the alkali metal iodide is shipped in a separate packet from the oxidizer. For convenience sake these packets are referred to as Packet A and Packet B. When the dairyman wants to make a teat dip solution he opens Packets A and B and dissolves the solids in the prescribed amount of water.

Again it should be noted that only minimal amounts of dry powder need to be shipped as the teat dip solution is formed at the venue of usage.

The excess chlorine based oxidizing agent stays in the reaction solution and disassociates to form active Cl+ ions, with the net result that the final solution has both disinfecting active Cl+ and I+ ions.

In its simplest form, a dry powder iodine salt i.e. powdered sodium iodide is dissolved in water to form a solution of sodium iodide and placed in a mixer. In the mixer the sodium iodide is reacted with a solution of an N-chloro organic compound i.e. a solution of trichloromelamine. In the mixer the I-ion is oxidized to diatomic iodine which immediately goes into solution as active I+ ions. The resulting solution of the Cl+ and I+ ions is now ready for usage as a teat cleaner.

For use in sanitizing teats and udders, solutions in accordance with this invention can contain from about 50 to about 10,000 ppm of the active I+ ion, another range is from about 100 to about 1,000 ppm, with a narrow range being from about 200 to about 750 ppm. An exemplary concentration is 300 ppm.

As is described above cleaning solutions in accordance with this invention contain both active Cl.+ and I+ ions.

For use in sanitizing teats and udders, solutions in accordance with this invention can contain from about 10 to about 1,000 ppm of the active Cl+ ion, another range is from about 50 to about 500 ppm, with a narrow range being from about 100 to about 300 ppm. An exemplary concentration is 300 ppm.

As is discussed above the teat and udder cleaning solution of this invention operate best on the acidic side. Cleaning solutions for use herein can operate at a pH of from about 1 to about 7. Another suitable operating range is from about 2 to about 5. With still another pH range being from about 3 to about 4. An exemplary pH is 3.5.

Solutions for use in this invention may further include other substances such as coloring agents, wetting agents, surfactants, healing agents, dyes, thickening agents, skin conditioning agents and softeners. These additives facilitate the application of the solutions to the teat and aid in keeping the bovine teat healthy and in optimum condition for milk production.

Surfactants as an additive are advantageous as they allow the solution to completely wet out the surface of the teat. For use in this invention non ionic and anionic surfactants are preferred.

Coloring agents may be added to color the formulations. Coloring agents are added to achieve a desired color. The concentration of the coloring agent is usually less than 1 percent, s suitable coloring agents are Graphtol Blue 6825-3 and yellow dye #5 FD&C.

The concentration of thickening agents may vary with the thickening agent used. A preferred thickening agent for use in this invention is Cellosize HEC Qp-100M-H, as is sold by the Dow Chemical Company of Midland, Mich.

Softening agents or skin conditioning agents may also be added to keep the teat in condition for milking. A preferred skin conditioning agent is sorbitol such as surbagem powder crystalline NF/FCC grade.

All concentrations as are listed above are for the final post or pre dip solutions and are based on an aqueous dip solution.

An important additive for use in accordance with this invention, is a wetting agent. wetting agents allow udder and teat areas to wet out. This wetting out allows the active ions to come into contact with the target bacteria.

As to the three types of wetting agents, cationic, anionic and nonionic, for use in this Invention anionic wetting agents are most preferred, followed by non anionic wetting agents with cationic wetting agents being least preferred.

Examples of suitable wetting agents which are useful in accordance with this invention are: Avanel S-74 and Dodecylbenesulfonic acid (DDBSA).

The most preferred wetting agent for use in this invention is an anionic wetting agent sold under the trademark Avanel S-74 by the BASF Chemical Co. of Mt. Olive, N.J. The applicant believes that Avanel S-74 is Ethoxylated ROH sulfonate, where R is $CH_3$, $CH_3CH_2$ or $CH_2CH_2$.

An effective amount of the desired wetting agent is used. Solutions containing from about 0.05 to about 2 weight percent of a wetting agent have been found to be effective in accordance with this invention.

Further the performance of the active Cl+ and I+ solutions in biocide formulations for use in this invention may be further enhanced by additives such phosphates i.e. mono sodium phosphate, disodium phosphate, buffering agents etc.

While the active halogen solutions are usually applied as an aqueous solutions, other solvents may be used.

Iodine salts are highly soluble in water therefore solutions in accordance with this invention can be easily compounded. Because these solutions can be easily compounded the iodine salt can be shipped in dry powder form i.e. in pre measured packets. The shipment in dry powder form results in substantial savings in shipping cost as compared to the prior art iodine solutions which must be shipped as heavy water based solutions.

The process of this invention may be used prior to the milking process as a pre dip, or after the milking process as a post dip, or and both as pre dip and post dip.

The process of this invention effectively kills all bacteria as may be on the udder and teat areas of a bovine in less than one minute.

The process of this invention is further advantageous in that it leaves a residual biocide coating on the udder and teat areas which inhibits future bacterial contamination.

Iodine based teat dips are the most commonly used teat dip and as such dairyman are familiar with using iodine based teat dips. Because the subject teat dips are iodine based the dairyman has a working familiarity with the same. This familiarity is advantageous as the ultimate user, the dairyman does not have to learn new technology.

EXAMPLES

The present invention is illustrated by the following Examples which are not to be constructed as limiting the invention to their details.

Example 1

A dry blend formulation was formed in accordance with Table 1.

TABLE 1

| ITEM | % AS POWDER | PPM IN SOLUTION BASED ON 250 PPM Cl |
|---|---|---|
| TCM | 4.0% | 275 PPM |
| CITRIC ACID | 7.8% | 520 PPM |
| CALSOFT F-90 | 1.8% | 120 PPM |

TABLE 1-continued

| ITEM | % AS POWDER | PPM IN SOLUTION BASED ON 250 PPM Cl |
|---|---|---|
| MONOSODIUM PHOSPHATE | 1.2% | 67 PPM |
| POTASSIUM IODIDE | 5.8% | 400 PPM |
| GRAPHTOL BLUE 6825-3 | 6.8% | 450 PPM |
| SORBITOL | 72.6% | 4840 PPM |

One pound of the composition of Table 1 was dissolved in 150 pounds of water and mixed for five minutes to form a batch of teat dip solution. After mixing the resulting teat dip solution had a concentration of 250 ppm available chlorine and 300 ppm titralable iodine.

What is claimed is:

1. A process for sanitizing the udder and teat areas of an animal which comprises applying an effective amount of a sanitizing solution, which contains both active I and Cl ions wherein the I ions are produced by the oxidation of sodium iodide with a trichloromelamine and wherein the concentration of the active I ion is about 300 ppm, and the concentration of the Cl ion is about 300 ppm, and the pH is from about 3 to about 4.

2. The process of claim 1 wherein the pH is 3.5.

3. A process for sanitizing the udder and teat areas of an animal, comprising:
   adding a powdered iodine salt to water to form a solution;
   adding trichloromelamine to the solution to the solution to produce a sanitizing solution containing active Cl and I ions, wherein the I ions are produced by the oxidization of the iodine salt with the trichloromelamine, the concentration of the active I ion is about 300 ppm, the concentration of the Cl ion is about 300 ppm, and the pH of the solution is from about 3 to about 4; and
   applying the sanitizing solution to the udder and teats area of the animal.

4. A process for sanitizing the udder and teat areas of an animal which comprises applying an effective amount of a sanitizing solution, which contains both active I and Cl ions wherein the I ions are produced by the oxidation of sodium iodide with a trichloromelamine and wherein the concentration of the active I ion is from about 50 to about 10,000 ppm, and the concentration of the Cl ion is from about 10 to about 1,000 ppm, and the pH is from about 1 to about 7.

5. The process of claim 4 wherein the concentration of the active I ion is from about 200 to about 750 ppm.

6. The process of claim 4 wherein the concentration of the Cl ion is from about 100 to about 300 ppm.

* * * * *